Aug. 14, 1923.
J. W. POTTENGER
CHICKEN COOP
Filed Feb. 11, 1921
1,464,581
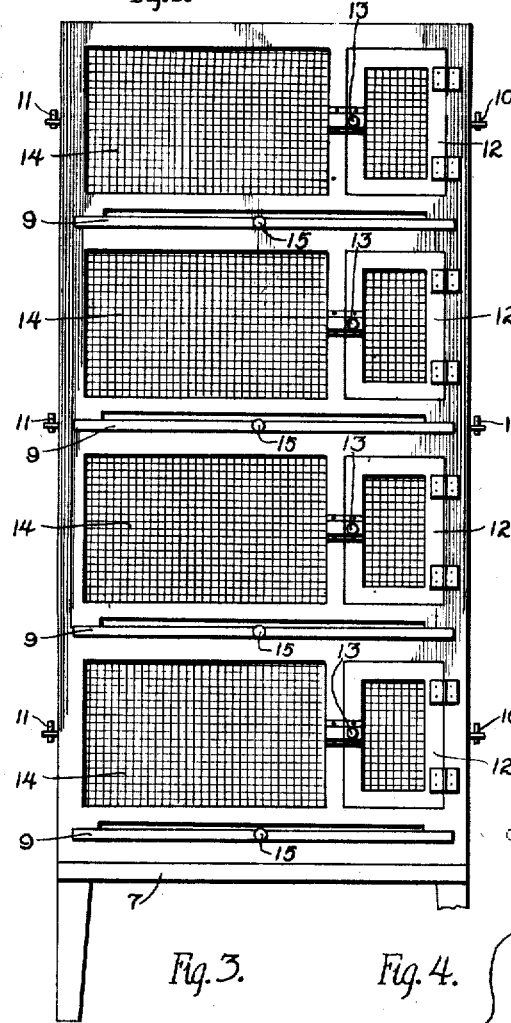
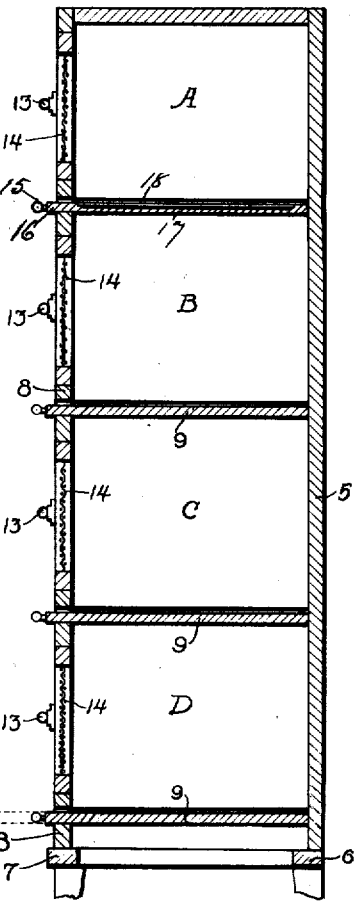
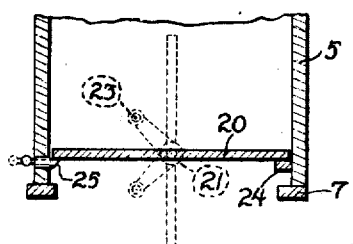
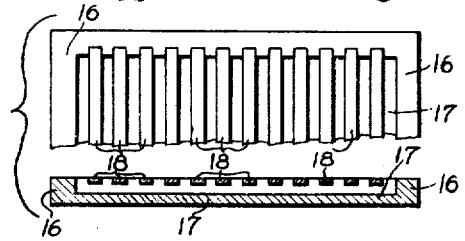
Inventor
James W. Pottenger
By Frank D. Thomasen
Atty.

Patented Aug. 14, 1923.

1,464,581

UNITED STATES PATENT OFFICE.

JAMES W. POTTENGER, OF KANKAKEE, ILLINOIS.

CHICKEN COOP.

Application filed February 11, 1921. Serial No. 444,111.

*To all whom it may concern:*

Be it known that I, JAMES W. POTTENGER, a citizen of the United States, residing at Kankakee, in the county of Kankakee and State of Illinois, have invented new and useful Improvements in Chicken Coops, of which the following is a full, clear, and exact description.

My invention relates to chicken-coops and particularly to a coop of peculiar construction for breaking hens of the brooding habit. Most hens after laying eggs a certain length of time instinctively become broody and will set on eggs or the empty nest continuously night and day expecting to hatch and brood chicks. Comparatively few hens are required for brooding purposes, the aim being egg production. This the broody habit greatly decreases as well as affecting the health of the hen and making it thin.

The object of my invention is to break the hens of this habit by imprisoning them for a certain number of days in an improved coop that is so constructed that the chicken raiser does not have to tax his memory as to the length of time the hens have been incarcerated, but only has to remember to manipulate the coop in a given manner at fixed intervals of time. The coop will thus systematize a work often poorly handled and more or less neglected by the average poultry handler.

My invention is hereinafter fully described, and is illustrated in the accompanying drawings, in which:

Figure 1 is a perspective view of my improved coop.

Figure 2 is a section of the same taken in a vertical plane midway between its sides.

Figure 3 is a transverse section of one form of the platforms or floors that divide said coop into compartments.

Figure 4 is a vertical section of another form of a platform.

Reference being had to the drawings 5 represents a rectangular box-shaped coop, in which the front edge of the bottom, 6, thereof, projects out in front of the front edges of the side walls of the same to form a shelf 7, upon which the lower edge of the removable frontwall 8 of the coop, rests.

This frontwall is provided between its top and bottom edges with a plurality of, say, four equidistant lateral slots, that extend from near one sidewall thereof to the other, and are made for the accommodation of sliding platforms or floors, 9, 9, whose side edges slide in horizontal grooves in the inner surfaces of the sidewalls of the coop and divide the same into, say, four compartments, A, B, C, and D. This frontwall is secured to and closes the coop by means of hooks and hasps 10, and 11, substantially as shown in Figure 1, and is provided with a door 12 between the uppermost floor 9 and the top edge of the same, and between the floors of the compartments below the uppermost one. These doors, 12, preferably, correspond in construction, and, as shown in the drawings, consist of an open rectangular frame covered with suitable screening and are, preferably, hinged to the sides of the door opening nearest the right-hand vertical edge of the frontwall and have simple locks 13, (such as can be easily procured in any hardware store), on the sides of the doorframe opposite said hinges.

Between each door and the left-hand side edge of the frontwall farthest from said doors, said frontwall is provided with comparatively large windows 14, that are also covered with suitable screening, so as to permit plenty of air and light to enter each compartment.

The front edge of each floor is either flush with or projects slightly beyond the front surface of the frontwall and each is provided with a knob or other suitable hand-grasp 15, at a point midway between its side edges by means of which it can be moved in or out. When these floors are pushed back into the coop until their rear edges engage the back of the same, they divide the coop into the aforesaid compartments, that are, preferably, of corresponding dimensions.

In operation, one or more broody hens are placed in the upper compartment A of the coop, through the door 12 thereof and are imprisoned therein for, say, one day. The floor of said upper compartment is then pulled out far enough to cause the hens to drop into the compartment B next below it. More broody hens are then placed in the uppermost compartment A and after confinement for another day the hens in compartment B are dumped into the third compartment C by pulling out the floor of said second compartment B. When the floor of compartment B has been pushed back into its proper place the hens in compartment A are dumped into the compartment B in the manner hereinabove explained.

Compartment A is then restocked with the hens becoming broody that day.

The filling of the lower compartment D is accomplished in the same way as B and C, thus filling all of the compartments of the coop from top to bottom.

After the expiration of another day the lowermost floor 9, of the lowermost compartment D, is withdrawn. The bottom 8 of the coop is provided with a large rectangular central opening and when the hens in the lowermost compartment D, are dropped therefrom by pulling out its floor, they are dropped onto the ground below the coop.

This confinement and dropping of the hens from one compartment to another does not require the operator to charge his memory with the knowledge of the length of time each hen has been incarcerated. All that he has to do is to put the broody hens through the coop in the manner described. This incarceration distracts and diverts the thought and attention of the hen from the desire to brood so that it will be cured of being broody by the time it obtains its freedom.

The desire of the hen to brood is greatest when it is first taken from the nest. Being first placed in the uppermost compartment, it is advisable to provide means therein that will thoroughly divert the attention of the hen and prevent its brooding. This I accomplish by a construction of the floor 9, thereof that makes it impossible for the hen to attempt to brood with any comfort. This floor consists of a rectangular frame 16, that has its under surfaces of side strips connected by a thin bottom 17, and its front and rear strips above said bottom connected by a series of longitudinal slats 18, that are about an inch and one half to two inches in width, and are separated about the same distance apart. This makes it awkward for and uncomfortable for the hen to brood, as its feet slip off of said slats and it cannot assume a comfortable brooding posture.

In Figure 3 of the drawings, I show a modified form of floor for these compartments, and particularly for the lowermost compartment D. In this modified form the floor, 20, is made to correspond to the horizontal rectangular dimensions of the inside of the compartments and it has pivoted trunnions 21 that project from the side edges thereof midway its length and are journaled in suitable bearings 22 in the sides of the coop. One of these trunnions extends beyond its bearings and has a crank 23 secured on the outer end thereof by means of which said bottom can be dumped. Either the front or the rear edge of this bottom is adapted, when closed, to rest upon a transverse cleat 24 secured to the backwall and the opposite edge is provided with a suitable spring-catch 25 (that can be easily procured in any hardware store), that will snap into its keeper (not shown) and maintain the floor in a horizontal position. In order to drop the floor 20 all that it is necessary to do, is to reach under the bottom of the coop and push said catch out of engagement with its keeper and then dump the floor through the medium of the crank. When it is desired to close this modified floor, the crank is manipulated to move it back in its horizontal position, in which the spring-catch will automatically engage its keeper and lock in its proper position.

What I claim as new is:

A chicken coop supported by legs above the ground or floor and comprising a plurality of compartments arranged one above the other, a sliding floor for each compartment the lowermost one of which dumps its contents on the ground or floor, and the uppermost of which has raised margins and superposed strips connecting the margins of opposite sides thereof, and a removable front-wall for said coop provided with doors and foraminous windows for each compartment, and transversely elongated openings out through which said floors can be withdrawn or inserted.

In witness whereof I have hereunto set my hand this 1st day of February, 1921.

JAMES W. POTTENGER.

Witnesses:
 FRANK D. THOMASON,
 VIOLET WARDELL.